United States Patent [19]

Call, Jr.

[11] 3,955,322

[45] May 11, 1976

[54] ENTRY LOCK

[76] Inventor: Charles W. Call, Jr., 52 Springbrook Road, Morristown, N.J. 07960

[22] Filed: July 2, 1973

[21] Appl. No.: 376,041

[52] U.S. Cl. .......................................... 49/40; 49/68
[51] Int. Cl.² ......................... E06B 3/34; E06B 5/00
[58] Field of Search ................... 49/68, 58, 59, 40; 109/6, 7, 8; 52/2; 232/48, 25, 58, 60

[56] References Cited
UNITED STATES PATENTS

| | | | |
|---|---|---|---|
| 475,556 | 5/1892 | Hale | 49/68 X |
| 617,308 | 1/1899 | Cobb | 49/68 |
| 1,005,535 | 10/1911 | Gillespie | 49/68 X |
| 1,905,547 | 4/1933 | Wood | 49/68 X |
| 2,051,753 | 8/1936 | Steckly | 49/40 |
| 2,076,765 | 4/1937 | Eldred | 109/7 |
| 3,045,615 | 7/1962 | Atchison | 49/40 X |

*Primary Examiner*—Dennis L. Taylor
*Attorney, Agent, or Firm*—Burgess, Dinklage & Sprung

[57] ABSTRACT

An entry lock for controlled ingress and egress for confined areas such as live animal growing and holding pens is disclosed. The entry lock includes a door opening, first and second doors spaced apart from each other and adapted to swing together about a common axis positioned at a side of the door opening into alternate register with the door opening, and a third door hingedly attached approximate the outside edge of the first or second door and latched approximate the outside edge of the other of the first or second doors forming a confined area or enclosure large enough to accomodate a human. The enclosure is formed by the third door in conjunction with the first and second doors. The structure prevents ingress and egress through the door opening when the first and second doors are swung together into alternate register with the door opening.

4 Claims, 5 Drawing Figures

ENTRY LOCK

BACKGROUND

This invention relates to an entry lock for controlled ingress and egress. More particularly, this invention relates to an entry lock for use in live animal growing and holding pens whereby a human can enter such pens and at the same time prevent ingress and egress to and from such pens. In live animal growing and holding pens it is important to insure that the animals do not get free. It is also important to prevent pets or other domestic animals from gaining entry to such a holding pen as a human enters the pen. Such an entry lock is especially important in the case of animals which are very valuable, subject to disease and/or difficult to catch.

Protective door structures are known but an entry lock such as provided by the present invention which prevents ingress and egress through a door opening while a human is entering a confined area has not been available.

For example U.S. Pat. No. 1,905,547 to Wood, issued Apr. 25, 1933, provides a protective entrance to a burglar-proof safe but does not prevent ingress and egress through the entry door opening while a human is passing through the protective entrance. U.S. Pat. No. 3,285,209 to Pace, issued Nov. 15, 1966 relates to a revolving door system which is designed to trap a fleeing criminal in a compartment sealed by rotation and locking of the revolving door. This structure does not prevent ingress and egress through the door opening while a human is gaining access to the confined area because of the several compartments in the revolving door system. U.S. Pat. No. 3,658,277 to Anderson, issued Apr. 25, 1972, relates to an aircraft anti-hijacking structure wherein a drum rotates to close off access to the passenger and pilot areas in an aircraft when an unauthorized person enters the drum thereby trapping such a person.

SUMMARY

The present invention overcomes the shortcomings of prior protective entry structures by providing an entry lock which effectively prevents ingress and egress through the door opening while a human is entering into or exiting from a confined area such as a live animal growing and holding pen. According to the present invention, an entry lock is provided having a primary door and a secondary door fixed relative to each other and adapted to pivot together. A third door pivots from the outside edge of either of the primary or secondary doors and latches with or at the outer edge of the primary or secondary doors. The three doors form an enclosure which is large enough to accomodate a human. When latched, the third door prevents ingress and egress through the door opening when the primary and secondary doors pivot to a position such that either is in the door opening. When either of the primary or secondary doors is in the door opening, the third door provides access to the enclosure from either side of the door opening depending on which of the primary or secondary doors is in the door opening.

More specifically the entry lock of the invention for controlled ingress and egress comprises the following:
 a. means defining a door opening;
 b. first and second door means spaced apart from each other and adapted to swing together about a common axis positioned at a side of the door opening into alternate register with the door opening; and
 c. third door means hingedly attached approximate the outside edge of the first or second door means and latched approximate the outside edge of the other of said first or second door means forming a confined area in conjunction with the first and second door means and preventing ingress and egress through said door opening when said first and second door means swing together into alternate register with the door opening.

DESCRIPTION OF THE DRAWING

The present invention will be more fully understood from the following description taken in conjunction with the accompanying drawing wherein.

DESCRIPTION

Figure 1:
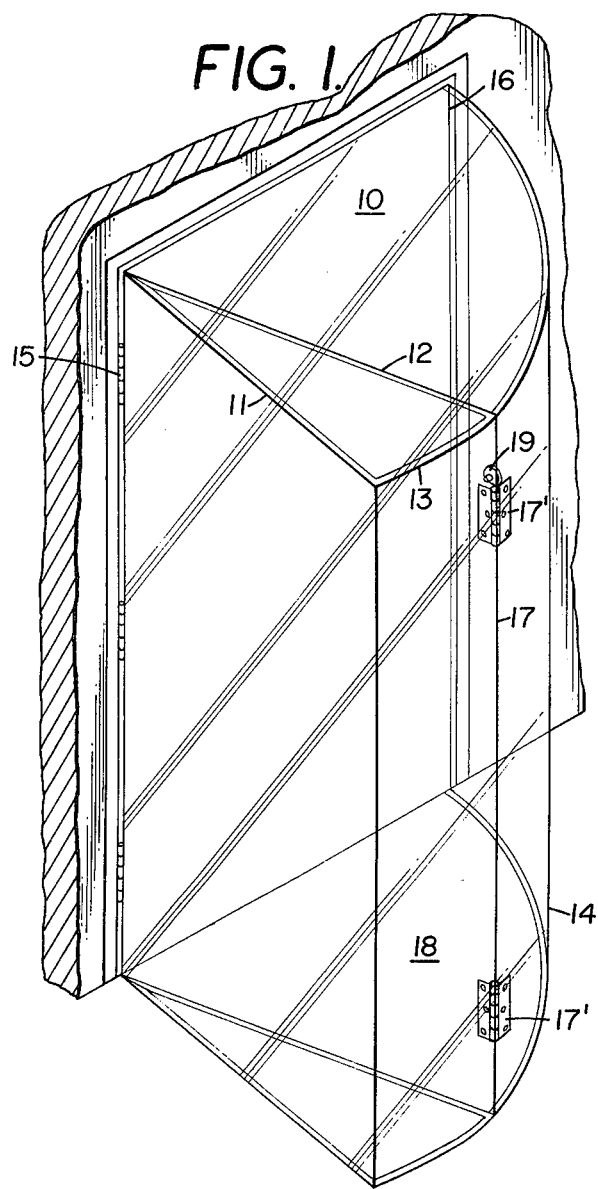
FIG. 1 is a perspective view of a preferred form of the entry lock of the invention.

Referring now to the drawing, the entry lock of the invention is shown to include a conventional door opening 16 with a first or primary door 10 which is normally adapted to close off the door opening 16. A second or secondary door 12 is spaced apart from the primary door 10 and is adapted to swing with the primary door 10 about a common axis 15 positioned at a side of the door opening 16 into alternate register therewith.

A third door 14 is hingedly attached approximate the outside edge of door 12 at 17 via hinges 17'. The door 14 is latched approximate the outside edge of door 10 via latch means 19. The door 14 can be reversed that is it can be hingedly attached to the outside edge of door 10 and latched to the outside edge of door 12.

Door 14 which is preferably curved or arcuate as shown in the drawing, forms a confined area or enclosure 18 which is large enough to accomodate a human desiring to enter a confined area via the entry lock of the invention.

In a preferred embodiment the outside edge of door 12 is extended transversely at 13 to provide register for the door 12 with the door opening 12 over an area equal to the width of the member 13. Member 11 can be included as shown in the drawing for structural support thus giving the door 12 a pie-shaped configuration.

Figure 2:
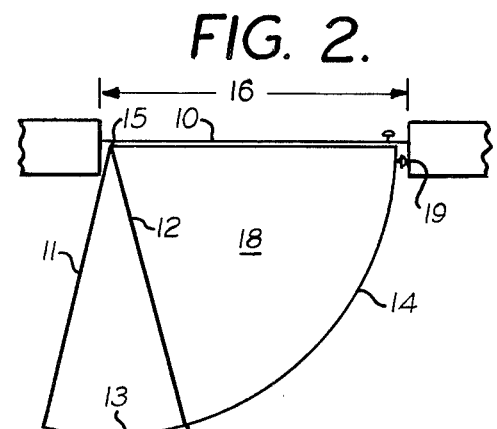
FIGS. 2 through 5 are top views partly broken away of the entry lock shown in FIG. 1 in various positions relative to the door opening.
Figure 3:
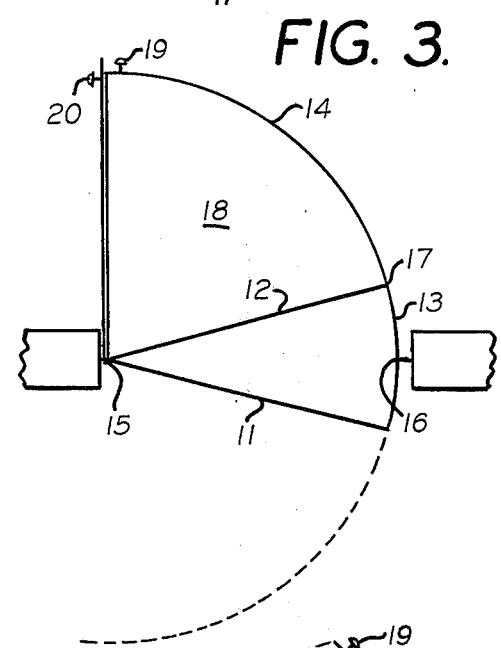
Figure 5:
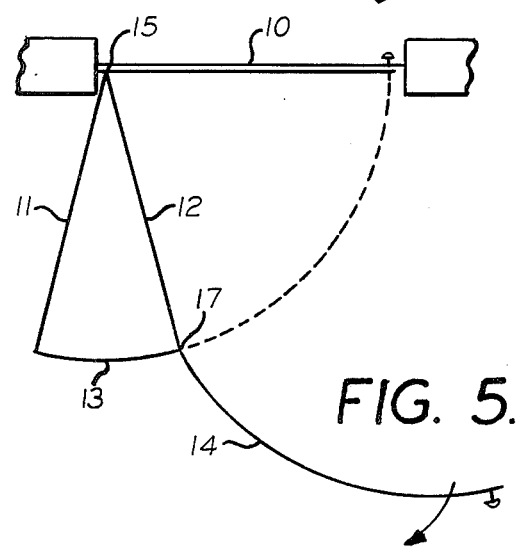
Figure 4:
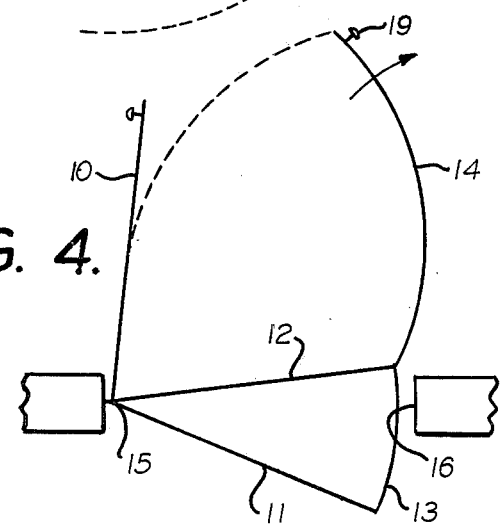

To operate the entry lock of the invention, a person desiring to gain access to a confined area from the outside of door 10 first opens the latter from the position shown in FIGS. 1 and 2 of the drawing to the position shown in FIG. 3. As the entire assembly moves from a position where door 10 is in registry with the door opening 16 to a position where the door 12 is in registry with the door opening, door 14 effectively prevents egress and ingress through the door opening 16. In the position shown in FIG. 3, the entrant opens door 14 via latch 19 while the door 12 with cooperating parts 11 and 13 effectively seals off the door opening 16. The person opening the door 14 then enters the enclosure 18 and closes the door 14 after himself. The entrant then pushes against door 12 causing the entire lock structure to swing inwardly until it reaches the position shown in FIG. 5 of the drawing. Once inside with door 10 secured in the door opening 16 the entrant can easily open the door 14 and enter the confined area. To exit from the confined area the operation described above is simply reversed.

The entry lock of the invention has the advantage that the door opening 16 is at all times sealed when the doors 10 and 12 are moving into alternate register with the door opening 16. In the position shown in FIG. 5 a person desiring to leave the confined area opens the door 14 and steps into the confined area 18. If an occupant of the confined area such as a live animal accompanys the individual into the confined area 18 it is a simple matter to exclude such an animal from the confined area before closing the door 14 and exiting through the entry lock by swinging the entire structure outward.

The entry lock in the invention can be positioned on the inside of an entry door vis-a-vis a confined area as represented in the drawing or the opposite structure can be employed depending of the ultimate use of the entry lock itself.

The door opening 16 can be formed by conventional wooden or metal door frame. The entry lock itself can be constructed from a host of like or dislike conventional building materials which may be transparent, translucent, opaque, porous or solid. For example the door 10 may have a conventional wooden or metal construction and the wedge-shaped door 11, 12, 13 and the third door 14 can be made of a porous material such as screening or a transparent material such as clear plastic. In the case of the screening, appropriate framing members made of wood or metal can be used to support the screen material. The use of a porous or transparent material has the advantage that a person using the entry lock can see into the interior of the confined area to determine the location of occupants of the confined area upon opening the primary door 10.

The door 14 is preferably curved or arcuate as shown in the drawing so as to insure that the door opening 16 is sealed off when the entry lock is moved or swung from one position to the next as shown for example in FIGS. 2 and 3 of the drawing. If desired however the door 14 can be straight connecting the outside edges of the doors 10 and 12.

Various modifications and changes can be made in the structure of the entry lock of the invention without departing from the spirit and scope thereof.

What is claimed is:

1. Entry lock for controlled ingress and egress comprising:
   a. means defining a door opening;
   b. first and second door means spaced apart from each other and adapted to swing together about a common axis positioned at a side of the door opening into alternate register therewith; and
   c. third door means hingedly attached approximate the outside edge of the first or second door means and latched approximate the outside edge of the other of said first or second door means forming a confined area in conjunction with said first and second door means and preventing ingress and egress through said door opening when said first and second door means swing together into alternate register with the door opening.

2. Entry lock of claim 1 wherein the outside edge of the first or second door means is transversely extended providing register with said door opening over a given area.

3. Entry lock of claim 1 wherein said third door means is arcuate.

4. Entry lock of claim 1 wherein said first door means is solid and said second and third door means are made of a porous, transparent or translucent material.

* * * * *